(12) United States Patent
Welch et al.

(10) Patent No.: US 8,172,176 B2
(45) Date of Patent: May 8, 2012

(54) INTEGRAL COMPOSITE SLIDER FOR AIRCRAFTS

(75) Inventors: John M. Welch, Wichita, KS (US); Thomas D. Popp, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 644 days.

(21) Appl. No.: 12/365,620

(22) Filed: Feb. 4, 2009

(65) Prior Publication Data

US 2010/0193632 A1   Aug. 5, 2010

(51) Int. Cl.
*B64C 25/68* (2006.01)

(52) U.S. Cl. ............... 244/110 B; 244/131; 244/117 R; 244/129.1; 60/226.2; 464/52; 464/88; 74/88; 74/89.33

(58) Field of Classification Search .............. 244/110 B, 244/131, 117, 129.1; 464/52, 87, 88; 74/88, 74/89.32, 89.33
See application file for complete search history.

(56) References Cited

U.S. PATENT DOCUMENTS

| 4,541,673 | A |   | 9/1985  | Greiert          |         |
|-----------|---|---|---------|------------------|---------|
| 5,161,752 | A |   | 11/1992 | Cockerham et al. |         |
| 5,239,822 | A | * | 8/1993  | Buchacher        | 60/226.2|
| 5,251,435 | A | * | 10/1993 | Pauley           | 60/226.1|
| 5,806,302 | A |   | 9/1998  | Cariola et al.   |         |
| 6,129,311 | A | * | 10/2000 | Welch et al.     | 244/117 R|
| 6,546,715 | B1|   | 4/2003  | Blevins et al.   |         |
| 6,584,763 | B2|   | 7/2003  | Lymons et al.    |         |

* cited by examiner

*Primary Examiner* — J. Woodrow Eldred
(74) *Attorney, Agent, or Firm* — Hovey Williams LLP

(57) ABSTRACT

A slider apparatus integral with a slidable member and a method for integrating the slider apparatus with the slidable member. The slider apparatus integrated with the slidable member may be configured to slidably couple with and be structurally supported by a fixed structure. The slider apparatus may comprise a primary slider component made of composite material and at least one chamfered element bonded to the primary slider component. The slidable member may comprise the slider apparatus, a core assembly, a plurality of composite material plies wrapped around the slider apparatus and core assembly and cured therewith, and at least one low-friction slider shoe removably attached to the primary slider component outward of the plurality of composite material plies.

15 Claims, 8 Drawing Sheets

INTEGRAL COMPOSITE SLIDER FOR AIRCRAFTS

BACKGROUND

1. Field

The present invention relates to aircraft components. More particularly, the invention relates to an integral slider apparatus and a method of integrating the slider apparatus into a translatable structure, such as a fan duct of an aircraft.

2. Related Art

An aircraft may comprise a variety of slidably connected components. For example, in various aircrafts, a thrust reverser comprised of a translating sleeve may be slidably attached to a fixed structure. Specifically, a main slider fitting or slider for the translating sleeve may be the primary structural support for an outer fan duct wall to connect to upper and lower bifurcation beams of the thrust reverser. The main slider may also allow the translating sleeve to slide aft and deploy the blocker doors.

In various prior art examples, the main slider may be comprised of metal and fastened onto the outer fan duct wall with a plurality of durable fittings. These fittings must be strong enough to support the weight of the thrust reverser or other aircraft components. Therefore the fittings add to the cost and weight of the aircraft.

Typically the slider is attached by bolting or riveting to an outer wall of an aircraft structure such as a translating sleeve, fan duct, etc. In this location, the slider's load path is typically offset from the neutral axis of symmetry of the aircraft structure. This offset creates an inefficient load path, in which the strain of the load on the aircraft structure is locally concentrated at the areas where the bolts or rivets attach the slider to the aircraft structure. The strain caused by an inefficient load path from the slider to the aircraft structure it is bolted to may lead to cracks and other structural faults in the aircraft structure over time. Additionally, the drilling of holes for rivets or bolts creates discontinuities in the structure, initiating numerous points of stress, which may also lead to cracks or other structural faults in the aircraft structure.

Accordingly, there is a need for an apparatus and method for slidably supporting a thrust reverser that overcomes the limitations of the prior art.

SUMMARY

The present invention provides an apparatus and method for slidably supporting a slidable member relative to a fixed structure. The apparatus may be a slider apparatus integrated with the slidable member, such as a translating sleeve. The slider apparatus may comprise a primary slider component, composed of a carbon tow bundle and a first plurality of composite material plies, and at least one chamfered element. The slidable member may comprise the slider apparatus, a core assembly, a second plurality of composite material plies wrapped around the slider apparatus and core assembly and cured thereto, and at least one low-friction slider shoe bolted to the slider apparatus outward of the second plurality of composite material plies. Furthermore the slider apparatus may be centered along a neutral axis of symmetry of the core assembly to create an optimal load path when the slidable member is slidably supported on the fixed structure.

The primary slider component may be formed of the first plurality of composite material plies wrapped around the composite tow bundle and cured or otherwise hardened together. The primary slider component may comprise a cylindrical portion and a flange portion. The at least one chamfered element may be bonded and/or co-cured to the flange portion of the primary slider component.

The second plurality of composite material plies may be wrapped around the primary slider component and the at least one chamfered element bonded and/or cured thereto. Additionally, the second plurality of composite material plies may also wrap around the core assembly, binding the primary slider component and the at least one chamfered element to the core assembly. The flange portion of the primary slider component may be centered at a neutral axis of symmetry of the core assembly. The primary slider component, the at least one chamfered element, and the core assembly, may be cured or otherwise hardened together to form one integral composite part. Then the at least one low-friction slider shoe may be bolted or otherwise fastened to the cylindrical portion of the primary slider component outward of the second plurality of composite plies.

These and other important aspects of the present invention are described more fully in the detailed description below.

BRIEF DESCRIPTION OF THE DRAWINGS

Embodiments of the present invention are described in detail below with reference to the attached drawing figures, wherein.

Figure 1:
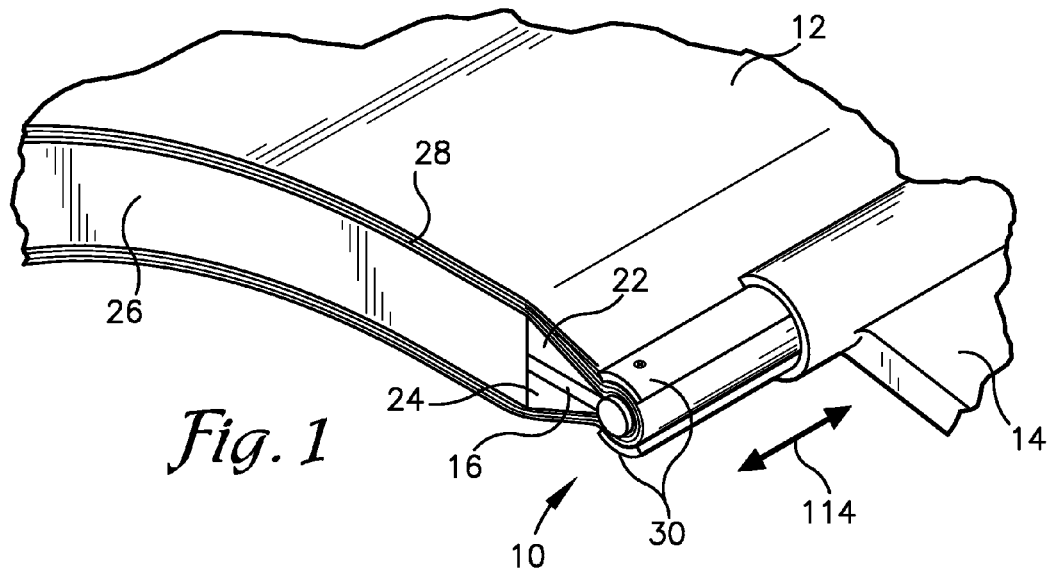
FIG. 1 is a fragmentary perspective view of a slider apparatus slidable coupled with a fixed structure and integrated with a slidable member constructed in accordance with an embodiment of the present invention.

The drawing figure does not limit the present invention to the specific embodiments disclosed and described herein. The drawing is not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

FIG. 1 illustrates a slider apparatus 10 integral with a slidable member 12 and configured to slidably connect with and be structurally supported by a fixed structure 14. The slider apparatus may comprise a primary slider component 16, which may be composed of a carbon tow bundle 18 (illustrated in FIG. 3) and a first plurality of composite material plies 20, as illustrated in FIGS. 2-5, and one or more elongated chamfered elements 22,24 bonded to the primary slider component 16, as illustrated in FIGS. 10-14. The slidable member 12, as illustrated in FIG. 1, may comprise the slider apparatus 10, a core assembly 26, a second plurality of composite material plies 28 wrapped around the slider apparatus 10 and core assembly 26 and cured and/or bonded thereto, and at least one low-friction slider shoe 30 bolted to the slider apparatus 10 outward of the second plurality of composite material plies 28.

For example, the slidable member 12 may be an aircraft structure such as a translating sleeve of a thrust reverser or a fan duct, and the fixed structure 14 may be an aircraft component such as a pylon or a hinge/latch beam for deploying a thrust reverser, or vise versa. The fixed structure 14 may comprise a track, rollers, etc for contacting the at least one slider shoe 30 to slide thereon. Note that the fixed structure 14 may be slidable relative to the slidable member 12 and/or the slidable member 12 may be slidable relative to the fixed 14, depending on the application.

As described above, the slider apparatus 10 may comprise the primary slider component 16 and one or more chamfered elements 22,24. It should be understood that any reference to the slider apparatus 10 herein may apply to one or more slider apparatuses which may be integrated into the slidable member 12. Specifically, multiple slider apparatuses may be integrated into a 350-degree fan duct disclosed in non-provisional U.S. patent application Ser. No. 12/365,376, titled CONTINUOUS COMPOSITE FAN DUCT AND THRUST REVERSER, filed on Feb. 4, 2009, which is incorporated herein by reference in its entirety.

Figure 2:
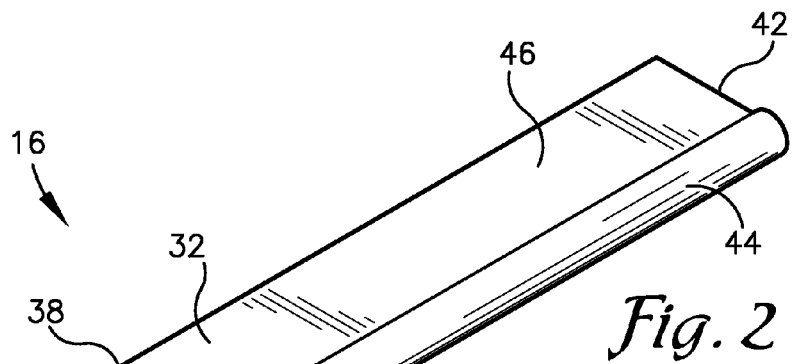
FIG. 2 is a perspective view of a primary slider component of the slider apparatus of FIG. 1.

As illustrated in FIG. 2, the primary slider component 16 may be made of any substantially durable material, but is preferably made of a multi-layered carbon-reinforced plastic, and may have a first side 32, a second side 34, a first end 36, a second end 38, a first edge portion 40, and a second edge portion 42. The first side 32 may be opposite of the second side 34, the first end 36 may be opposite of the second end 38, and the first edge portion 40 may be opposite of the second edge portion 42. The primary slider component 16 may also comprise a cylindrical portion 44, located at the first end 36 and extending from the first edge portion 40 to the second edge portion 42, and a flange portion 46 extending radially from the cylindrical portion 44 to the second end 38, and from the first edge portion 40 to the second edge portion 42. The flange portion 46 may have a length substantially equal to the cylindrical portion 44, a width wider than a diameter of the cylindrical portion 44, and a thickness smaller than the diameter of the cylindrical portion 44. However, the flange portion 46 may have any dimensions suitable for being integrated with the slidable member 12. Note that the cylindrical portion 44 may be of any elongated shape without departing from the scope of this invention. For example, the cylindrical portion 44 may be cylindrical or substantially rectangular, triangular, hexagonal, an i-beam, etc. as desired for a given application.

Figure 3:
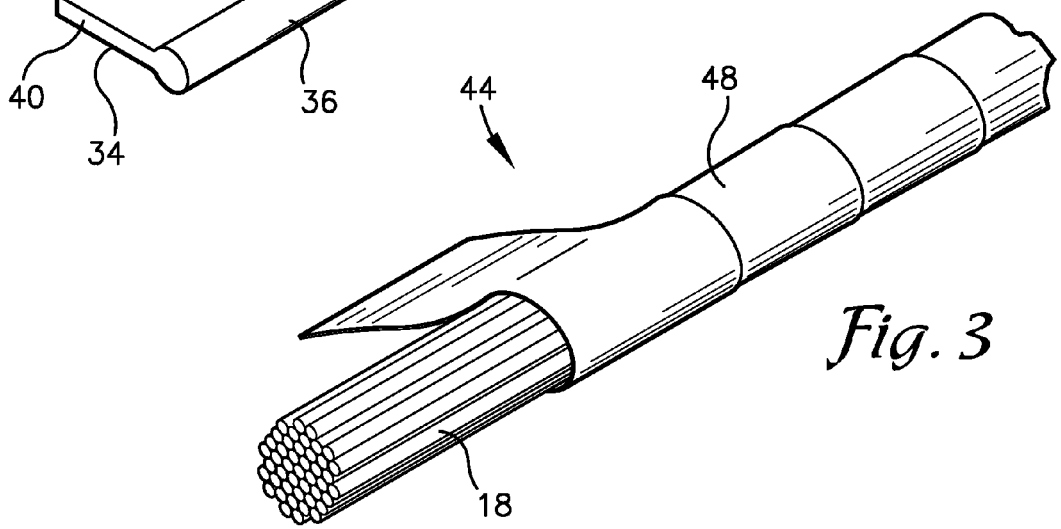
FIG. 3 is a fragmentary perspective view of a carbon tow bundle used in the primary slider component of FIG. 2.
Figure 4:
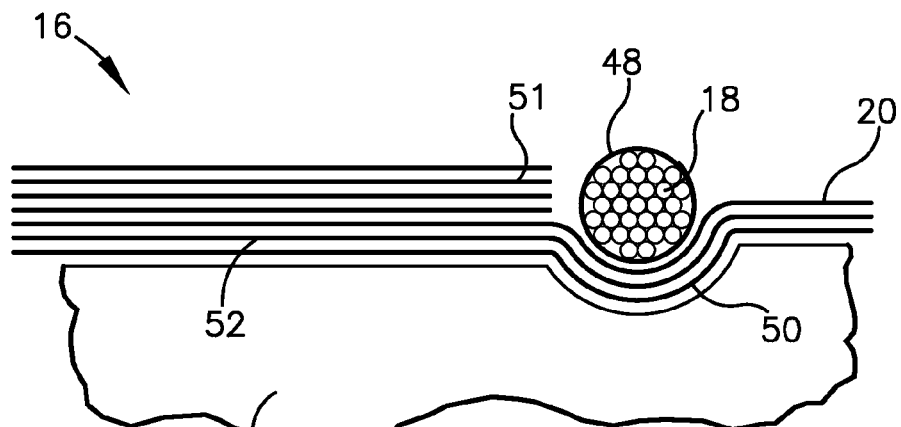
FIG. 4 is a fragmentary side elevation view of the carbon tow bundle and a first plurality of composite material plies.
Figure 5:
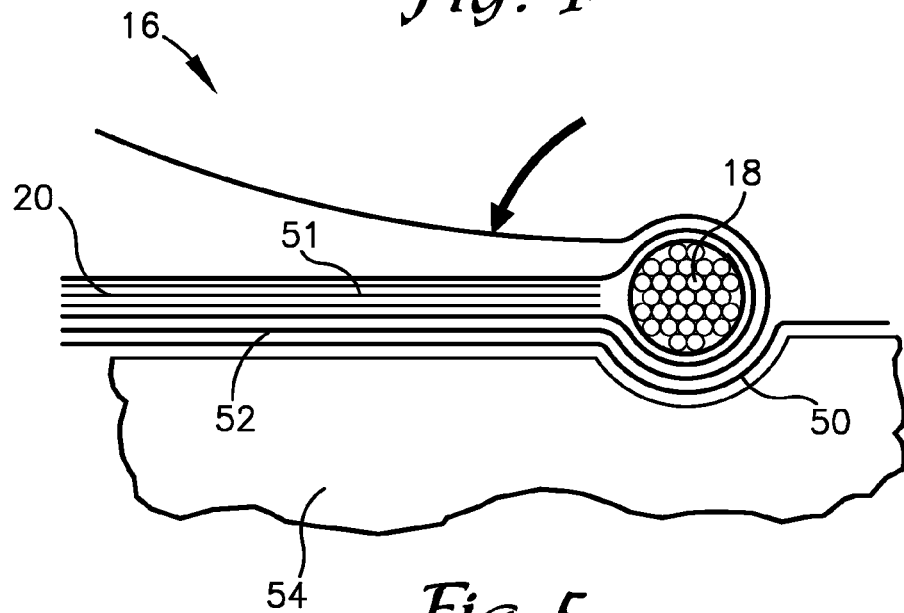
FIG. 5 is a fragmentary side elevation view of the first plurality of composite material plies being wrapped around the carbon tow bundle.

The primary slider component 16 may be composed of the elongated carbon tow bundle 18, such as graphite tow, and the first plurality of composite material plies 20, as illustrated in FIGS. 3-5. The carbon tows within the carbon tow bundle 18 may be oriented in a direction that is parallel to the first and second ends 36,38 along cylindrical portion 44 (illustrated in FIG. 2) and parallel to the line of proposed actuation 114 illustrated in FIG. 1. Orientation of the carbon tows along this direction maximizes structural efficiency and longitudinal axis bending resistance. However, any orientation of the carbon tows may be used.

The carbon tow bundle 18 may be wrapped or bound together by any suitable fabric 48 known in the art. The first plurality of composite material plies 20 may be substantially continuous composite plies having a first portion 50 wrapped substantially around the elongated carbon tow bundle 18, thereby forming the cylindrical portion 44, and a second portion 52 extending radially outward from the elongated carbon tow bundle 18, thereby forming the flange portion 46. Additionally, the second portion 52 of the first plurality of composite material plies 20 may comprise filler plies 51 to give the flange portion 46 the desired thickness. The first plurality of composite material plies 20 and the elongated carbon tow bundle 18 may be hardened and bonded together through a composite curing process.

Figure 6:
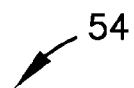
FIG. 6 is a side elevation view of a curing tool for curing the primary slider component of FIG. 2.
Figure 6:
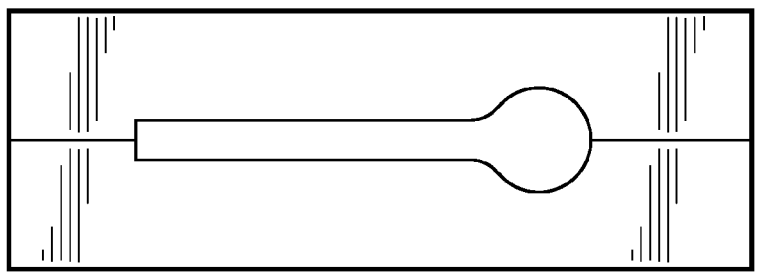

Specifically, the primary slider component 16 may be bagged and compressed via vacuum bag and autoclave pressure, and then heated to cure and/or co-bond the elongated carbon tow bundle 18 with the first plurality of composite material 20. For example, the curing process may heat the primary slider component 16 to approximately 270 degrees F. Additionally, a curing tool 54 having a space therein of the desired size and shape of the primary slider component 16 may be used to cure the primary slider component 16 as illustrated in FIG. 6. The curing tool 54 may be made of an alloy of iron containing 35.5% nickel, such as INVAR, or any other suitable material having a low coefficient of thermal expansion.

Figure 7:
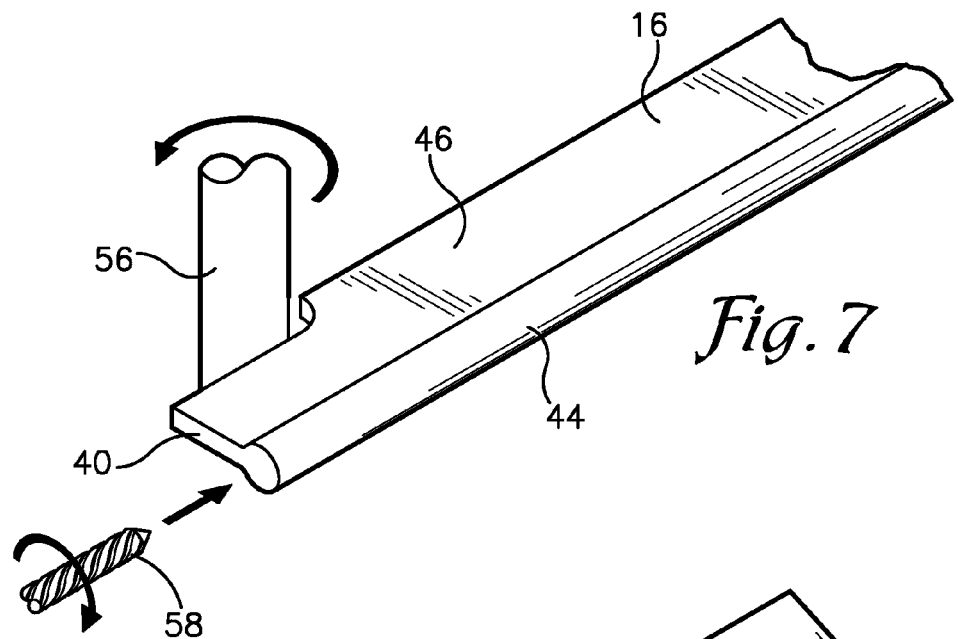
FIG. 7 is a fragmentary perspective view of the primary slider component of FIG. 2 being trimmed.

The cured primary slider component 16 may be trimmed as needed, using a cutter 56, as illustrated in FIG. 7, or any suitable trimming methods known in the art. Additionally, the primary slider component 16 may comprise bores of any desired depth, which may be drilled into the first and or second edge portions 40,42 using a boring tool 58. These bores may be used to assist in positioning the primary slider component 16 relative to the slidable member 12, as later described herein.

Figure 8:
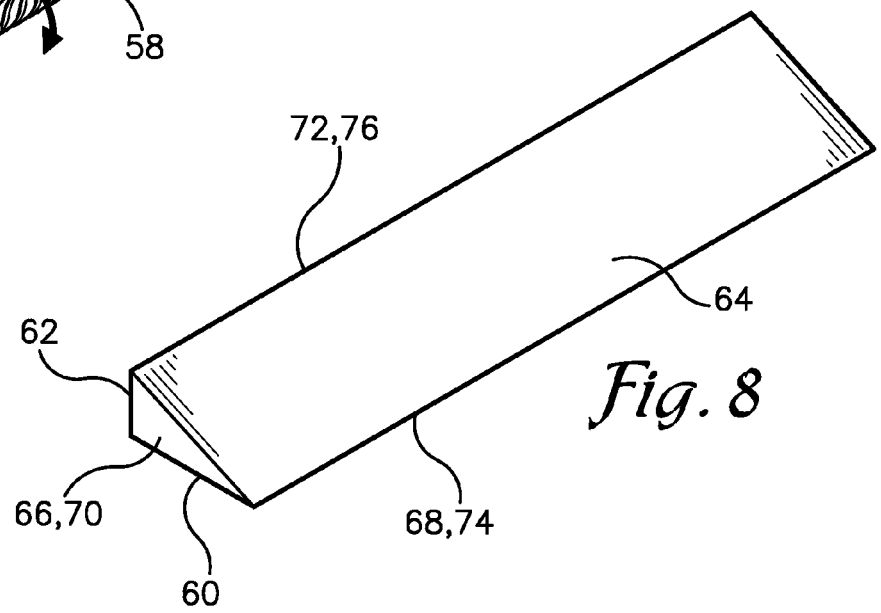
FIG. 8 is a perspective view of a chamfered element of the slider apparatus of FIG. 1.
Figure 9:
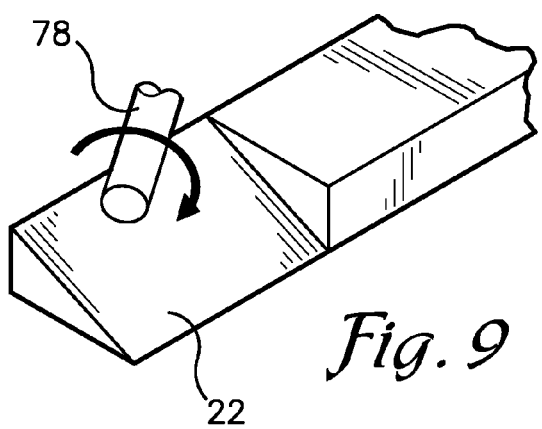
FIG. 9 is a fragmentary perspective view of the chamfered element of FIG. 8 illustrating the manufacture of its beveled face.
Figure 10:
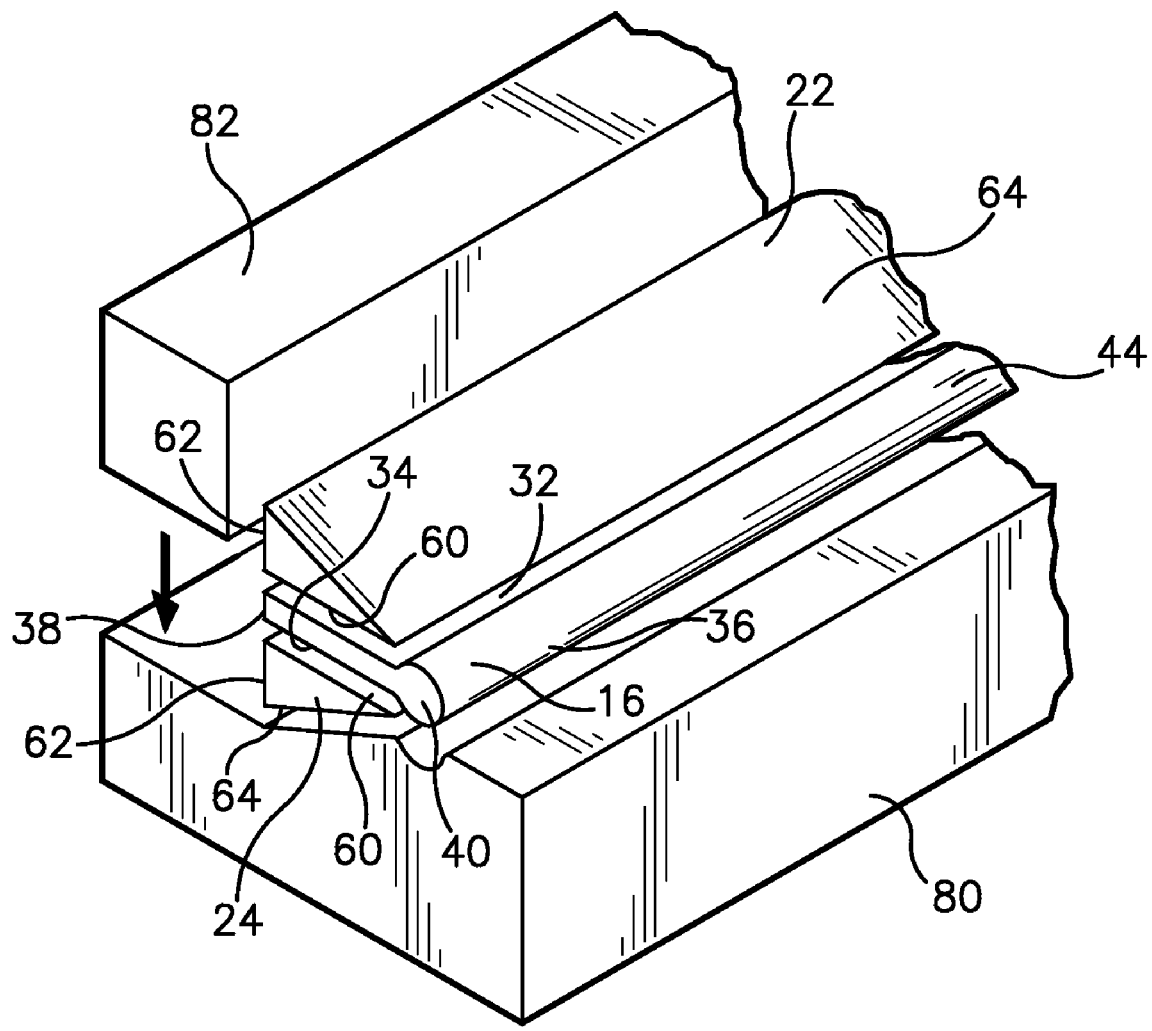
FIG. 10 is an exploded, fragmentary perspective view of the slider apparatus of FIG. 1 being placed against various tooling components.
Figure 11:
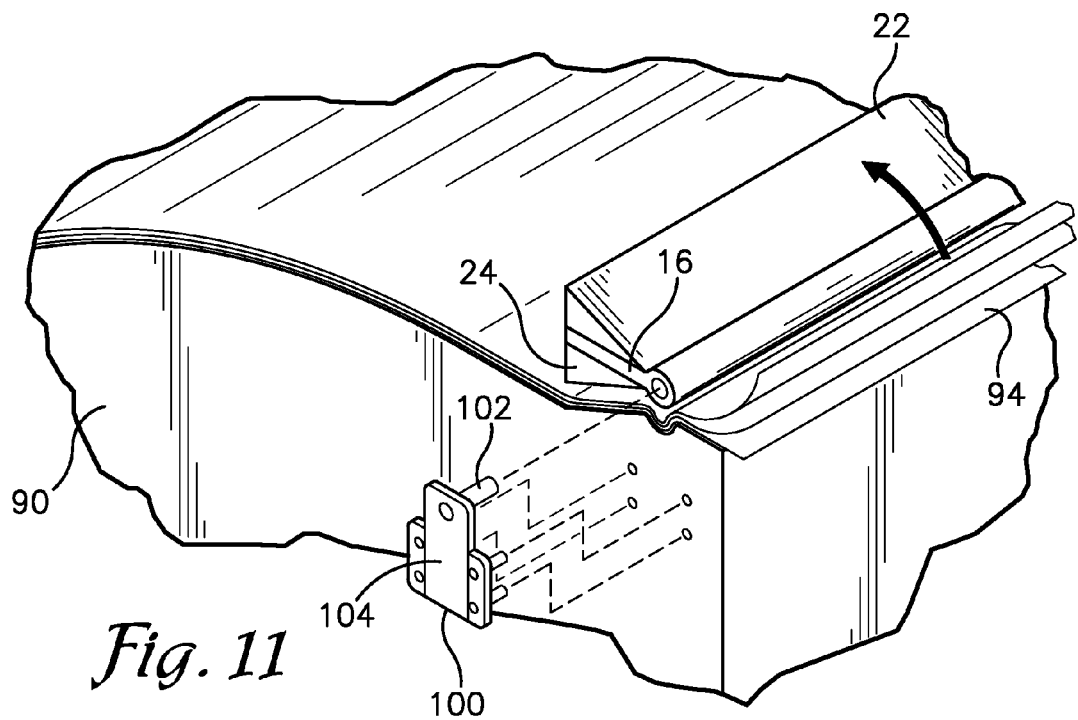
FIG. 11 is a partially exploded, fragmentary perspective view of the slider apparatus and tool side plies being wrapped around the slider apparatus.

As illustrated in FIGS. 8-10, the elongated chamfered elements 22,24 may be formed of a dense heat resistant phenolic (HRP) or graphite core or any suitable material known in the art and may each have a first face 60, a second face 62, and a beveled face 64. The first face 60 may have a first edge 66 and a second edge 68, the second face 62 may have a first edge 70 and a second edge 72, and the beveled face 64 may have a first edge 74 and a second edge 76. The first edge 66 of the first face 60 may contact the first edge 70 of the second face 62 at a substantially right angle, though any angle may be formed at these edges 66,70. Additionally, the beveled face 64 may extend from the second edge 68 of the first face 60 to the second edge 72 of the second face 62, and may form a non-right angle with both the first face 60 and the second face 62. For example, the non-right angle may be 30-degrees, or any other non-right angle. As illustrated in FIG. 9, the chamfer elements 22,24 may be carved by an overhead shaper 78 or any tool known in the art for shaping a substantially hard core material. The first and/or second faces 60,62 of the chamfered elements 22,24 may each have a length and/or a width approximately equal to the length and the width of the flange portion 46 of the primary slider component 16.

As illustrated in FIG. 10, the chamfered elements 22,24 may be cured and/or co-bonded to the flange portion 46 of the primary slider component 16 using structural adhesives known in the art. The first face 60 of one of the chamfered elements 22 may be bonded to the flange portion 46 on the first side 32 of the primary slider component 16, and the first face 60 of another of the chamfered elements 24 may be bonded to the flange portion 46 on the second side 34 of the primary slider component 16. For example, at least one of the chamfered elements 22,24 may be bonded to the second portion 52 (illustrated in FIG. 5) of the first plurality of composite material plies 20 on at least one of the first side 32 and the second side 34 of the primary slider component 16 using structural adhesives known in the art.

The bonding of the chamfered elements 22,24 to the primary slider component 16 may include tooling 80, such as a clam tool or bonding assembly jig as illustrated in FIG. 10, and/or fairing bars 82 to hold the chamfered elements 22,24 and primary slider component 16 in place during the bonding process. Additionally, adhesive interfaces (not shown) may be inserted between the chamfered elements 22,24 and the flange portion 46 (see FIG. 2) of the primary slider component 16 to assist in bonding the components together.

Figure 12:
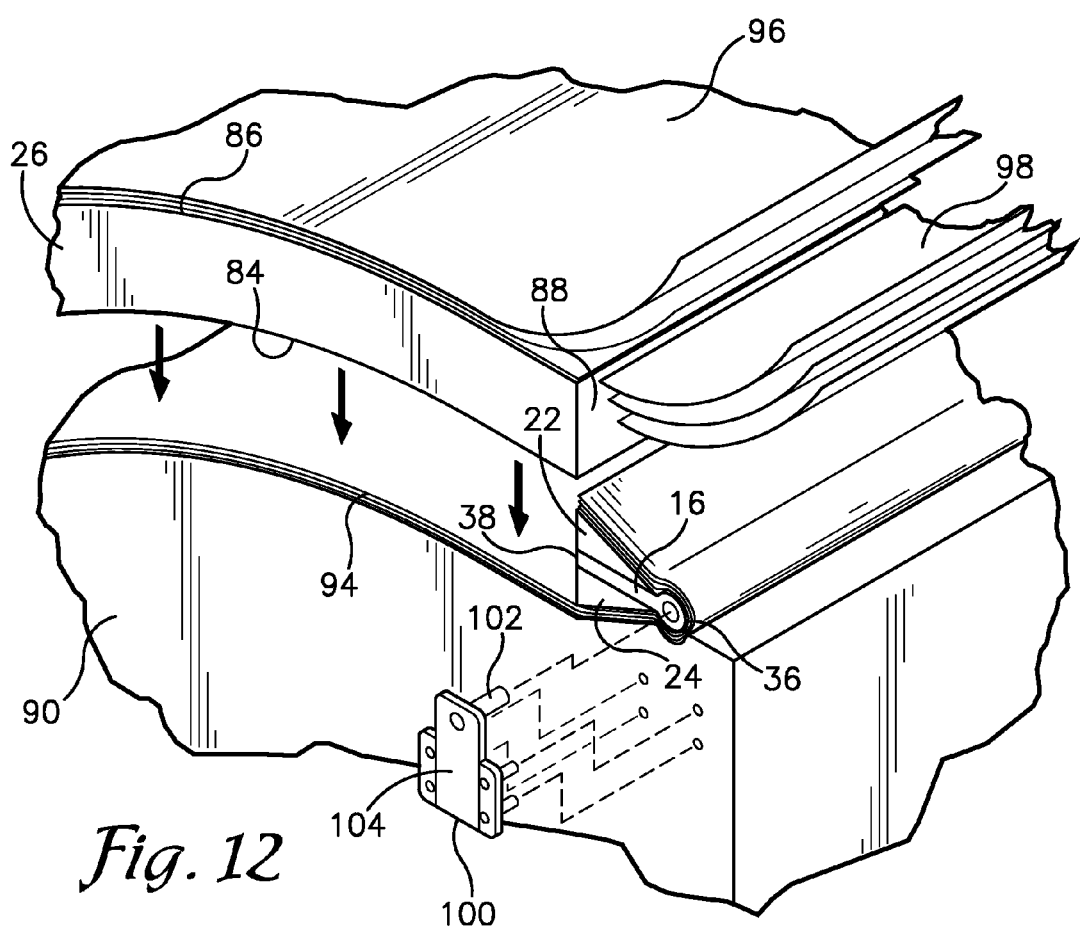
FIG. 12 is a partially exploded, fragmentary perspective view of the slider apparatus and tool side plies of FIG. 11 as integrated with a core assembly, doubler plies, and bag side plies to form the slidable member of FIG. 1.
Figure 13:
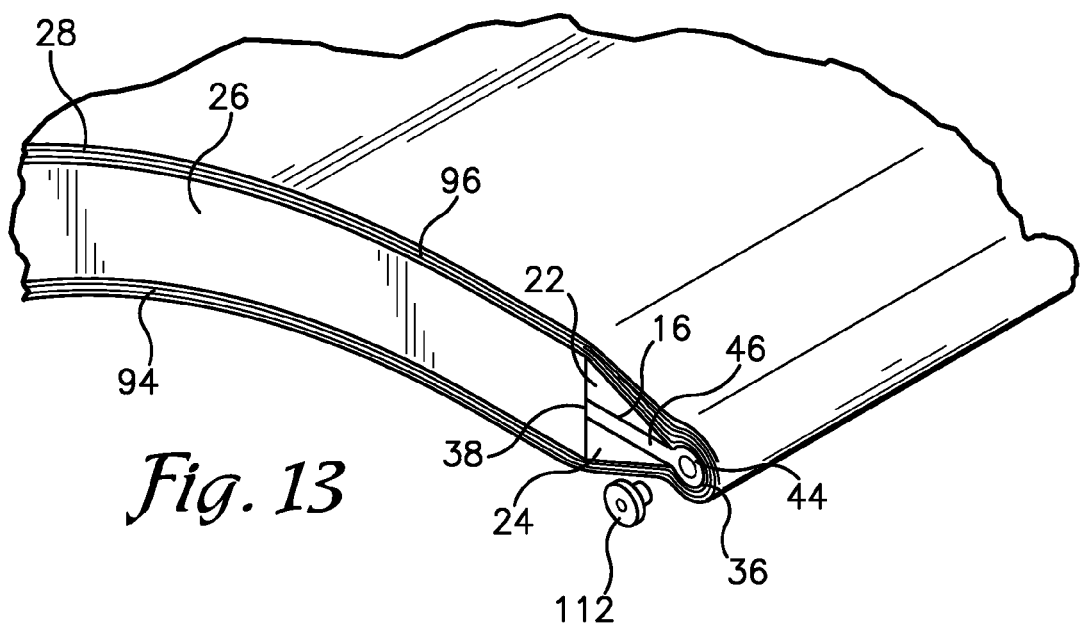
FIG. 13 is a fragmentary perspective view of the slidable member of FIG. 1 including a CRES brushing.

Illustrated in FIGS. 12-13, the core assembly 26 may have a first face 84, a second face, 86, and at least one end portion 88. Additionally, the core assembly may be made of heat resistant phenolic (HRP), aluminum, pitch, pan, or suitable honeycomb core material capable of being acoustically treated and may be shaped to substantially match the shape of a tool surface of a lay-up tool 90, such as a mandrel. The at least one end portion 88 of the core assembly 26 may align with the second faces 62 of the chamfered elements 22,24. In various embodiments of the invention, the combined height of the second faces 62 of the chamfered elements 22,24 and the thickness of the flange portion 46 (illustrated in FIG. 2) of the primary slider component 16 may be substantially equal to the thickness of the core assembly 26 and/or the height of the end portion 88 of the core assembly 26. However, the core assembly 26 may be thinner or thicker and may have any suitable shape or dimensions.

Figure 14:
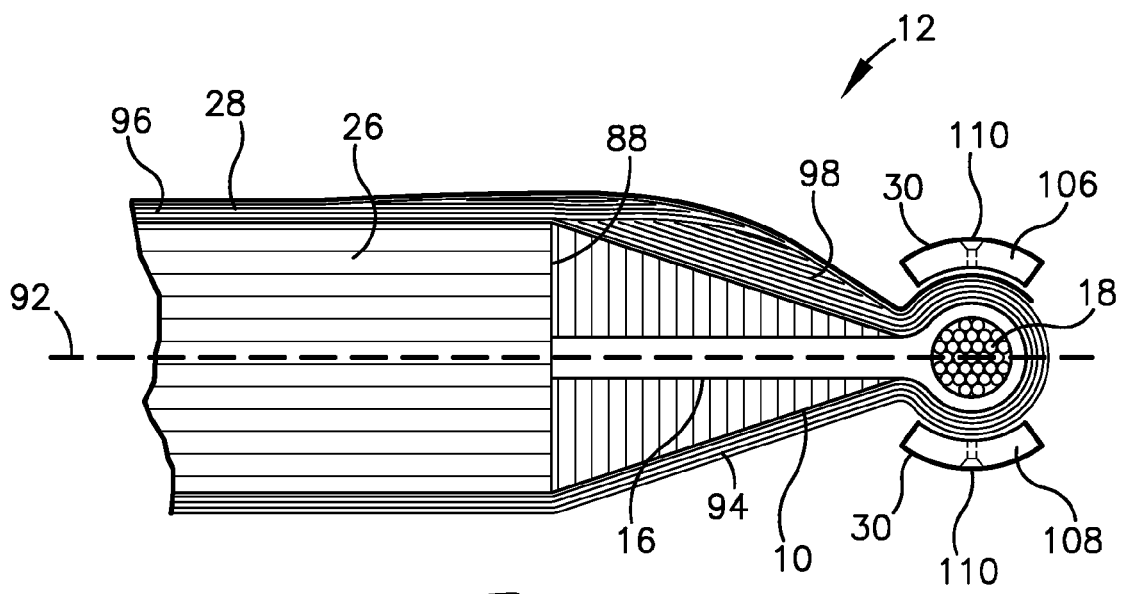
FIG. 14 is a fragmentary, cross-sectional side elevation view of the slidable member of FIG. 1, including two portions of a slider shoe.

Specifically, as illustrated in FIG. 14, the core assembly 26 may naturally have a neutral axis of symmetry 92, which may be midway between the first face 84 and the second face 86, such that the second end 38 of the primary slider component 16 may be centered along the neutral axis of symmetry 92 of the core assembly 26 at the at least one end portion 88. When integrated together, centering the slider apparatus 10 along the neutral axis of symmetry 92 of the core assembly 26 may create an optimal load path when the slidable member 12 is supported on the fixed structure 14. Once the slider apparatus 10 is integrated with the slidable member 12 in this configuration, the load placed on the slider apparatus 10 may therefore be more evenly distributed throughout the slidable member 12, as opposed to prior art methods where the slider apparatus attached at a position offset from the neutral axis of symmetry of the slidable member.

As illustrated in FIGS. 11-14, the second plurality of composite material plies 28 may surround at least a portion of the slider apparatus 10 and the core assembly 26 to form inner and/or outer surfaces of the slidable member 12. The second plurality of composite material plies 28 may comprise tool side plies 94, bag side plies 96, and doubler plies 98. The tool side plies 94 may be disposed on the tool surface of the lay-up tool 90, such as a mandrel. The tool side plies 94 may wrap substantially around the chamfered elements 22,24 and primary slider component 16 of the slider apparatus 10, and then the core assembly 26 may be placed over the tool-side plies 94, centered with the slider apparatus 10 as described above.

Then the primary slider element 16 may be held in place by at least one fastening apparatus 100 which may fasten into the lay-up tool 90 or mandrel and the primary slider component 16. Specifically, the fastening apparatus 100 may comprise at least one pin 102 and an intermediate attachment element 104. The pins 102 may be inserted into the bores at the first and second edge portions 40,42 of the primary slider component 16, and may also be attached to the intermediate attachment element 104. In turn, the intermediate attachment element 104 may be attached to the lay-up tool 90 or mandrel. In this way, the tool side plies 94 and slider apparatus 10 may be held in place during curing.

The bag side plies 96 may be applied over the core assembly 26 and over or aligned with at least one of the chamfered elements 22,24 and may be adjacent a vacuum bag and/or autoclave during curing of the slidable member 12, which may include the use of structural adhesives known in the art. Doubler plies 98 may be smaller pieces of ply which may be inserted between the bag side plies 96 and the core assembly 26 and/or slider apparatus 10 to increase the thickness of various portions of the slidable member 12 as required for various applications. Additionally, doubler plies 98 may be used between the tool side plies 94 and the core assembly 26 or the slider apparatus 10 if needed to increase thickness of portions of the slidable member 12.

As illustrated in FIGS. 1 and 14, the at least one low-friction slider shoe 30 may be composed of low-friction tetrafluorethylene, such as TEFLON or RULON bonded to aluminum, or any other substantially rigid, durable, and/or low-friction material to accommodate wear. The slider shoe 30 may extend the full length of the primary slider component 16, or may be any other length desired for a given application. The slider shoe 30 may have a first portion 106 attached to or fixed proximate the cylindrical portion 44 on the first side 32 of the primary slider component 16 and a second portion 108 attached to or fixed proximate the cylindrical portion 44 on the second side 34 of the primary slider component 16. For example, the first portion 106 of the slider shoe 30 may be bolted or otherwise fastened with a fastener 110 such as a bolt, screw, rivet, etc. to the primary slider component 16, as illustrated in FIG. 14. Additionally, in various embodiments of the invention, the slider shoe 30 may be of a clam-shell-like configuration such that the two portions 106,108 of the slider shoe 30 may substantially surround the cylindrical portion 44 of the primary slider component 16. The slider shoe 30 may be attached to the primary slider component 16 by any method known in the art, but is preferably removably attached such that if the slider shoe 30 becomes worn or damaged, it may easily be replaced.

Figure 15:
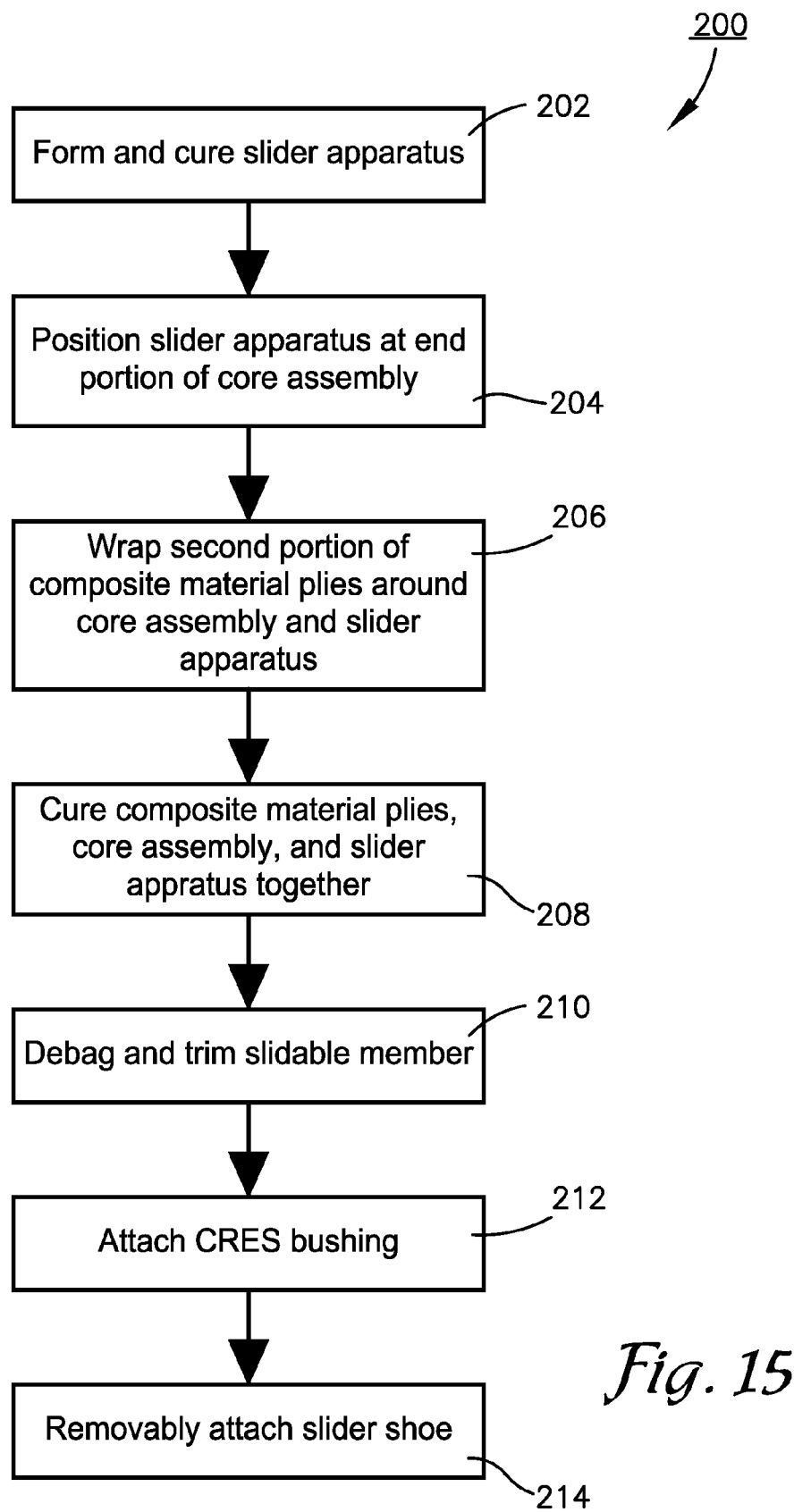
FIG. 15 is a flow chart illustrating a method for integrating the slider apparatus and slidable member of FIG. 1.

According to various embodiments of the invention, a method 200 for integrating the slider apparatus 10 with the slidable member 12 is illustrated in FIG. 15. As depicted in step 202, the slider apparatus may first be formed and cured. As discussed above, forming the slider apparatus may comprise wrapping the carbon tow bundle with composite material and curing them together to form the primary slider component 16, as well as bonding and/or curing one or more chamfered elements to the flange portion of the primary slider component 16.

Then, as depicted in step 204, the slider apparatus 10 may be positioned adjacent the at least one end portion 88 of the core assembly 26 such that the slider apparatus 10 is centered with the neutral axis of symmetry 92 of the core assembly 26 as described above. As depicted in step 206, the second plurality of composite material plies 28 may be wrapped around the slider apparatus 10 and the core assembly 26, and then, as depicted in step 208, hardened and bonded together through a curing process using structural adhesives known in the art. The curing process may comprise sealing an airtight bag over the parts to be cured, removing air from between the lay-up tool 90 and the bag, and curing the parts in an autoclave using both heat and pressure. Specifically, the second plurality of composite plies 28, the core assembly 26, and the slider apparatus 10 may be vacuum bagged against the lay-up tool 90 or mandrel and cured in an autoclave or by any other means known in the art. When cured together, these components may form a composite part, such as a fan duct having at least one integral slider apparatus 10.

Once the curing process is complete, then the second plurality of composite material plies 28, the primary slider component 16, the chamfered elements 22,24, and the core assembly 26 may be debagged and any excess material may be trimmed off, as depicted in step 210. Step 212 depicts attaching at least one titanium or corrosion resistant steel (CRES) bushing 112 (illustrated in FIG. 13), by means of bond-in or cold bond, at one or each edge portion 40,42 of the primary slider component 16 relative to the cylindrical portion 44. One advantage of the at least one bushing 112 is, if repair to the slidable member 12 is needed, the at least one bushing 112 may serve as a durable indexing feature.

Step 214 depicts attaching the at least one slider shoe 30 to the slider apparatus 10 and the second plurality of composite material plies 28. The slider shoe 30 or slider shoes may be attached to the cylindrical portion 44 of the primary slider component 16 of each of the slider apparatus 10 outward of the second portion of composite plies 28. Therefore, at least a portion of the second plurality of composite material plies 28 may be disposed between the slider shoe 30 and the primary slider component 16.

In use, the fixed structure 14 may be coupled with the at least one slider shoe 30 attached to the slider apparatus 10 such that an actuator (not shown) may actuate the slidable member 12 to slide forward or afterward relative to the fixed structure 14 along the at least one slider shoe 30, as illustrated by arrow 114 in FIG. 1. By integrating the slider apparatus 10 into the slidable member 12, there may be a weight and cost decrease, since fewer attachment fittings may be required. Additionally, as described above, the present invention achieves a more efficient load path than prior art methods.

Figure 16:
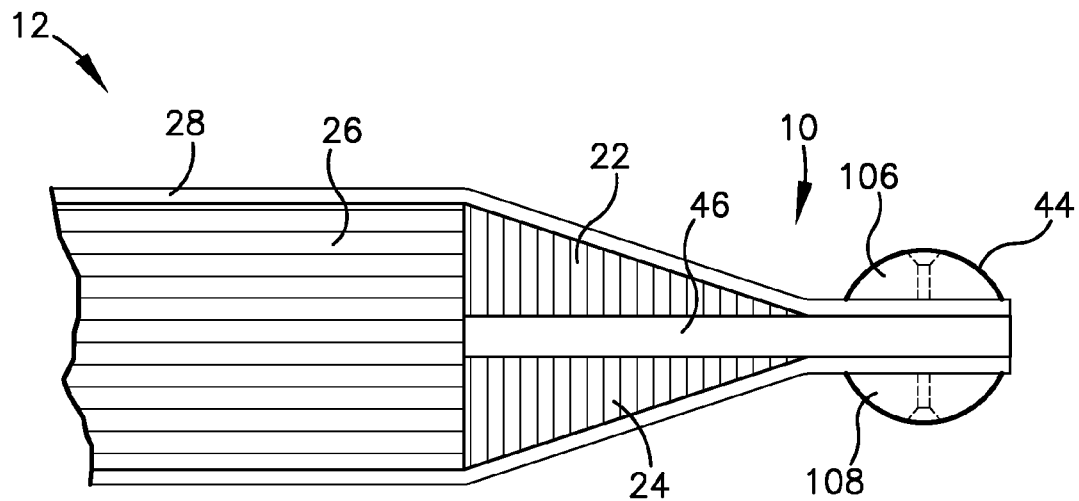
FIG. 16 is a fragmentary, cross-sectional side elevation view of an alternative embodiment of the slidable member and the slider apparatus without the tow bundle.
Figure 17:
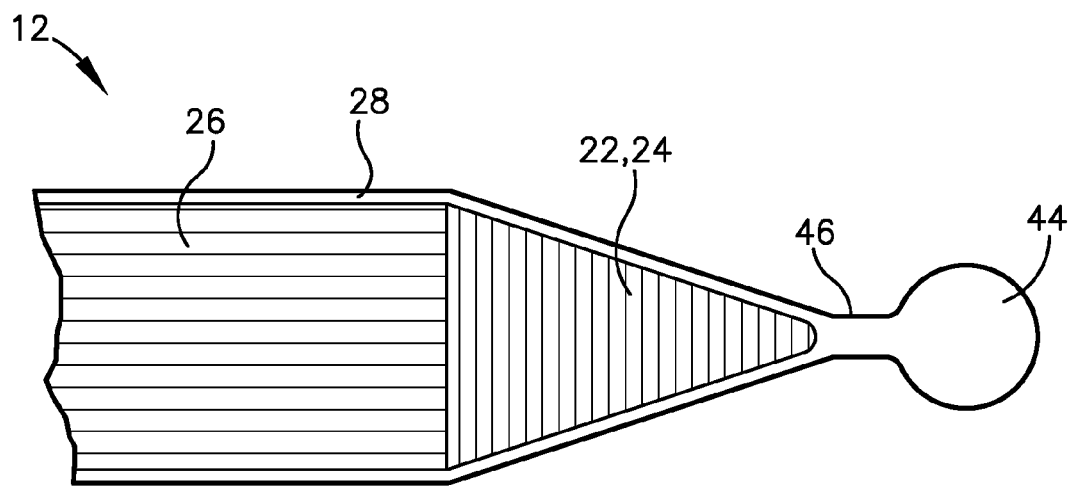
FIG. 17 is a fragmentary, cross-sectional side elevation view of an alternative embodiment of the slidable member and slider apparatus having two chamfered elements bonded directly to each other or formed integral with each other.

Although the invention has been described with reference to the embodiments illustrated in the attached drawings, it is noted that equivalents may be employed and substitutions made herein without departing from the scope of the invention as recited in the claims. For example, in alternative embodiments of the slider apparatus 10, the cylindrical portion 44 of the primary slider component 16 may be formed by bolting two slider shoe portions 106,108 onto the flange portion 46, outward of the second plurality of composite plies 28, as illustrated in FIG. 16. In other alternative embodiments of the invention, the chamfered elements 22,24 may be bonded directly to each other or formed integral with each other, and the flange portion 46 of the primary slider component 16 and/or the second plurality of composite plies 28 may form around at least a portion of the chamfered elements 22,24 and the core assembly 26, as illustrated in FIG. 17.

Having thus described an embodiment of the invention, what is claimed as new and desired to be protected by Letters Patent includes the following:

1. A slidable member configured to slidably couple with a fixed structure, the slidable member comprising:
    a core assembly having a first face, a second face, an end portion, and a neutral axis of symmetry;
    a slider apparatus adjacent the end portion of the core assembly and centered approximately at the neutral axis of symmetry of the core assembly, wherein the slider apparatus further comprises a primary slider component having a cylindrical portion and a flange portion extending radially from the cylindrical portion; and
    a plurality of composite material plies wrapped around the core assembly and slider apparatus, wherein the core assembly, the slider apparatus, and the plurality of composite material plies are hardened and bonded together by a curing process.

2. The slidable member of claim 1, wherein the slider apparatus further comprises at least one elongated chamfered element having a beveled face, wherein the at least one elongated chamfered element is bonded to the flange portion of the primary slider component.

3. The slidable member of claim 1, wherein the cylindrical portion is composed of an elongated carbon tow bundle wrapped with composite material, and the flange portion is composed of hardened composite material.

4. The slidable member of claim 3, wherein carbon tows within the carbon tow bundle are oriented such that they are parallel to an axis of translation of the slidable member.

5. The slidable member of claim 1, wherein at least one low friction slider shoe is bolted onto the slider apparatus outward of the plurality of composite plies.

6. The slidable member of claim 1, wherein the fixed structure is at least one of a pylon and a hinge/latch beam of an aircraft for deploying a thrust reverser.

7. The slidable member of claim 1, wherein the slidable member is at least one of a fan duct of an aircraft and a translating sleeve of a thrust reverser.

8. A slidable member configured to slidably connect with and be structurally supported by a fixed structure, the slidable member comprising:
    a primary slider component having a first side, a second side, a first end, and a second end, the primary slider component including:
        an elongated tow bundle, and
        a first plurality of composite material plies, having a first portion wrapped around the elongated tow bundle, and a second portion extending radially outward from the elongated tow bundle, wherein the first plurality of composite material plies and the elongated tow bundle are hardened and bonded together through a composite curing process;
    at least one elongated chamfered element having a beveled face, wherein the at least one elongated chamfered element is attached to the second portion of the first plurality of composite material plies on at least one of the first side and the second side of the primary slider component;

a core assembly having a first face, a second face, and at least one end portion adjacent the second portion of the first plurality of composite material plies;

a second plurality of composite material plies substantially wrapped around the chamfered element, the primary slider component, and the first face and the second face of the core assembly and hardened together by a curing process;

at least one low-friction slider shoe removably fixed to the primary slider component relative the first portion of the first plurality of composite material plies and outward of the second plurality of composite material plies.

9. The fixed structure of claim 8, wherein the fixed structure is at least one of a pylon and a hinge/latch beam of an aircraft for deploying a thrust reverser.

10. The fixed structure of claim 8, wherein the slidable member is at least one of a fan duct of an aircraft and a translating sleeve of a thrust reverser.

11. A method of integrating a slider apparatus with a slidable member of an aircraft, the method comprising:
(a) positioning the slider apparatus adjacent an end portion of a hardened core assembly of the slidable member such that the slider apparatus is centered with a neutral axis of symmetry of the core assembly;
(b) wrapping a plurality of composite material plies around the slider apparatus and the core assembly;
(c) curing the composite material plies together with the slider apparatus and core assembly; and
(d) attaching a low-friction slider shoe to the composite material plies and the slider apparatus.

12. The method of claim 11, further comprising attaching at least one bushing to at least one end of the slider apparatus.

13. The method of claim 11, wherein the low-friction slider shoe is one of bolted and riveted to the slider apparatus.

14. The method of claim 11, further comprising the step of forming the slider apparatus prior to step (a) by:
wrapping an elongated bundle of tow with another plurality of composite material plies having a first portion wrapped around the elongated bundle of tow, and a second portion extending radially outward from the elongated bundle of tow, and
bonding together the another plurality of composite material plies and the elongated bundle of tow through a composite curing process.

15. The method of claim 14, the step of forming the slider apparatus further comprising bonding at least one chamfered element on at least one side of the second portion of the another plurality of composite material plies.

\* \* \* \* \*